United States Patent
Calmelat et al.

(10) Patent No.: US 7,441,642 B2
(45) Date of Patent: Oct. 28, 2008

(54) LOW INERTIA BALL BRAKE/CLUTCH

(75) Inventors: Michael J. Calmelat, Chandler, AZ (US); David M. Eschborn, Gilbert, AZ (US)

(73) Assignee: Honeywell International Inc., Morristown, NJ (US)

(*) Notice: Subject to any disclaimer, the term of this patent is extended or adjusted under 35 U.S.C. 154(b) by 337 days.

(21) Appl. No.: 11/254,087

(22) Filed: Oct. 19, 2005

(65) Prior Publication Data

US 2007/0084690 A1  Apr. 19, 2007

(51) Int. Cl.
  *F16D 41/061* (2006.01)
  *F16D 41/067* (2006.01)

(52) U.S. Cl. .......................... 192/45; 192/56.1; 192/65; 464/36

(58) Field of Classification Search .............. 192/56.1, 192/65
  See application file for complete search history.

(56) References Cited

U.S. PATENT DOCUMENTS

| | | | |
|---|---|---|---|
| 3,279,571 A * | 10/1966 | Wassilieff | 192/38 |
| 3,403,762 A * | 10/1968 | Auriol | 192/45 |
| 4,051,933 A | 10/1977 | Beneke et al. | |
| 4,838,400 A | 6/1989 | Fortune | |
| 5,035,311 A | 7/1991 | Girguis | |
| 5,713,446 A | 2/1998 | Organek et al. | |
| 5,896,968 A | 4/1999 | Bruntz | |
| 6,059,087 A | 5/2000 | Parry | |
| 6,068,097 A * | 5/2000 | Kurita | 192/27 |
| 6,231,475 B1 | 5/2001 | Avila | |
| 6,338,402 B1 | 1/2002 | Muramatsu et al. | |
| 6,435,325 B1 | 8/2002 | Miller et al. | |
| 6,543,592 B2 * | 4/2003 | Hori | 192/45 |
| 6,640,948 B2 | 11/2003 | Shirataki et al. | |
| 2003/0019708 A1 * | 1/2003 | Goto et al. | 192/35 |
| 2005/0087419 A1 | 4/2005 | Murakami | |

FOREIGN PATENT DOCUMENTS

WO  WO 9214072 A1 *  8/1992

\* cited by examiner

*Primary Examiner*—Richard M. Lorence
(74) *Attorney, Agent, or Firm*—Ingrassia, Fisher & Lorenz, P.C.

(57) ABSTRACT

A clutch assembly is provided that includes a rotor, a stator, a clutch element disposed between the rotor and stator, and an axial force source. First and second contact surfaces are disposed on the rotor and spaced axially apart. The second surface has a smaller radial distance to a rotor rotational axis than the first surface. The axial force source is in communication with the clutch element and is configured to supply a predetermined axial force to the clutch element. When an opposing axial force is applied to the clutch element, the assembly selectively (i) engages by providing contact between the clutch element and the first clutch element contact surface, when the opposing force is less than the predetermined axial force, and (ii) disengages by providing contact between the clutch element and the second clutch element contact surface, when the opposing force is greater than the predetermined axial force.

15 Claims, 7 Drawing Sheets

LOW INERTIA BALL BRAKE/CLUTCH

TECHNICAL FIELD

The present invention relates to clutch assemblies and, more particularly, to a low inertia brake clutch assembly.

BACKGROUND

When a jet-powered aircraft lands, the landing gear brakes and aerodynamic drag (e.g., flaps, spoilers, etc.) of the aircraft may not, in certain situations, be sufficient to slow the aircraft down in the required amount of runway distance. Thus, jet engines on most aircraft include thrust reversers to enhance the braking of the aircraft. When deployed, a thrust reverser redirects the rearward thrust of the jet engine to a generally or partially forward direction to decelerate the aircraft. Because at least some of the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Many of the thrust reverser designs include brake/clutch assemblies to inhibit unintended movement of the thrust reverser or actuators that move the thrust reverser. The assemblies may incorporate disk brakes or cone brakes that are coupled to conventional ball or roller clutches. The clutches typically include a rotatable shaft that extends through a stator, and rolling elements, such as balls or rollers, that are disposed therebetween.

Many times, a groove is included on one or both of the shaft and stator that provides a wide and a narrow gap therebetween. The wide gap allows the rolling elements to roll therein when the clutch is unlocked, and the narrow gap pinches the rolling elements between the shaft and stator when the clutch is locked. The rolling elements are further secured axially in the groove by a retaining force supplied by a spring or other source.

In some cases, a force may be exerted on the rolling elements that causes an extended period of pinching and/or unintended sliding between the various contact surfaces. As a result, the brake/clutch assembly may become worn. Alternatively, the rolling elements may become jammed against the stator and/or shaft, and the system may not operate properly. In other instances, such as when the brakes are reengaged after deployment of the thrust reverser system, the clutch may internally overrun which may cause one or more of the rolling elements to become displaced or misaligned with respect to adjacent rolling elements.

Hence, there is a need for a clutch assembly that experiences minimal wear during operation and has rolling elements that, if displaced or misaligned, do not affect the operation of the assembly. Additionally, it would be desirable for the assembly to be operable with various types of brakes. The present invention addresses this need.

BRIEF SUMMARY

A clutch assembly is provided that includes a rotor, clutch contact surfaces, a stator, a clutch element, and an axial force source. The rotor has a rotational axis and an outer surface. The first clutch element contact surface is disposed on the rotor outer surface. The second clutch element contact surface is disposed on the rotor outer surface, spaced axially from the first clutch element contact surface, and has a smaller radial distance to the rotational axis than the first clutch element contact surface. The stator is disposed around at least a portion of the rotor and has an inner surface. The clutch element is disposed between and in contact with the rotor and the stator inner surface. The axial force source is in communication with the clutch element and is configured to supply a predetermined axial force to the clutch element. When an opposing force is applied to the clutch element in a direction opposite the axial direction, the assembly selectively (i) engages by providing contact between the clutch element and the first clutch element contact surface, when the opposing force is less than the predetermined axial force, and (ii) disengages by providing contact between the clutch element and the second clutch element contact surface, when the opposing force is greater than the predetermined axial force.

In another embodiment, and by way of example only, the assembly includes a rotor, clutch element contact surfaces, a stator, a clutch element, and an axial force source. The rotor has a rotational axis and an outer surface. The first clutch element contact surface is disposed on the rotor outer surface. The second clutch element contact surface is disposed on the rotor outer surface, is spaced axially from the first clutch element contact surface, and has a smaller radial distance to the rotational axis than the first clutch element contact surface. The stator is disposed around at least a portion of the rotor and having an inner surface. The clutch element is disposed between and in contact with the rotor and the stator inner surface. The axial force source is in communication with the clutch element and is configured to supply a predetermined axial force to the clutch element. When an opposing force is applied to the clutch element in a direction opposite the axial direction, the assembly selectively (i) engages by providing contact between the clutch element and the first clutch element contact surface, when the opposing force is less than the predetermined axial force, and (ii) disengages by providing contact between the clutch element and the second clutch element contact surface, when the opposing force is greater than the predetermined axial force.

Other independent features and advantages of the preferred clutch will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a specific system design. Thus, although the description is explicitly directed toward an embodiment that is implemented in a cascade-type thrust reverser system, in which transcowls are used as the moveable thrust reverser component, it should be appreciated that it can be implemented in other systems, including other thrust reverser actuation system designs, such as "clamshell" or "target" thrust reversers, and with any other system in which a clutch assembly may be used.

Figure 1:
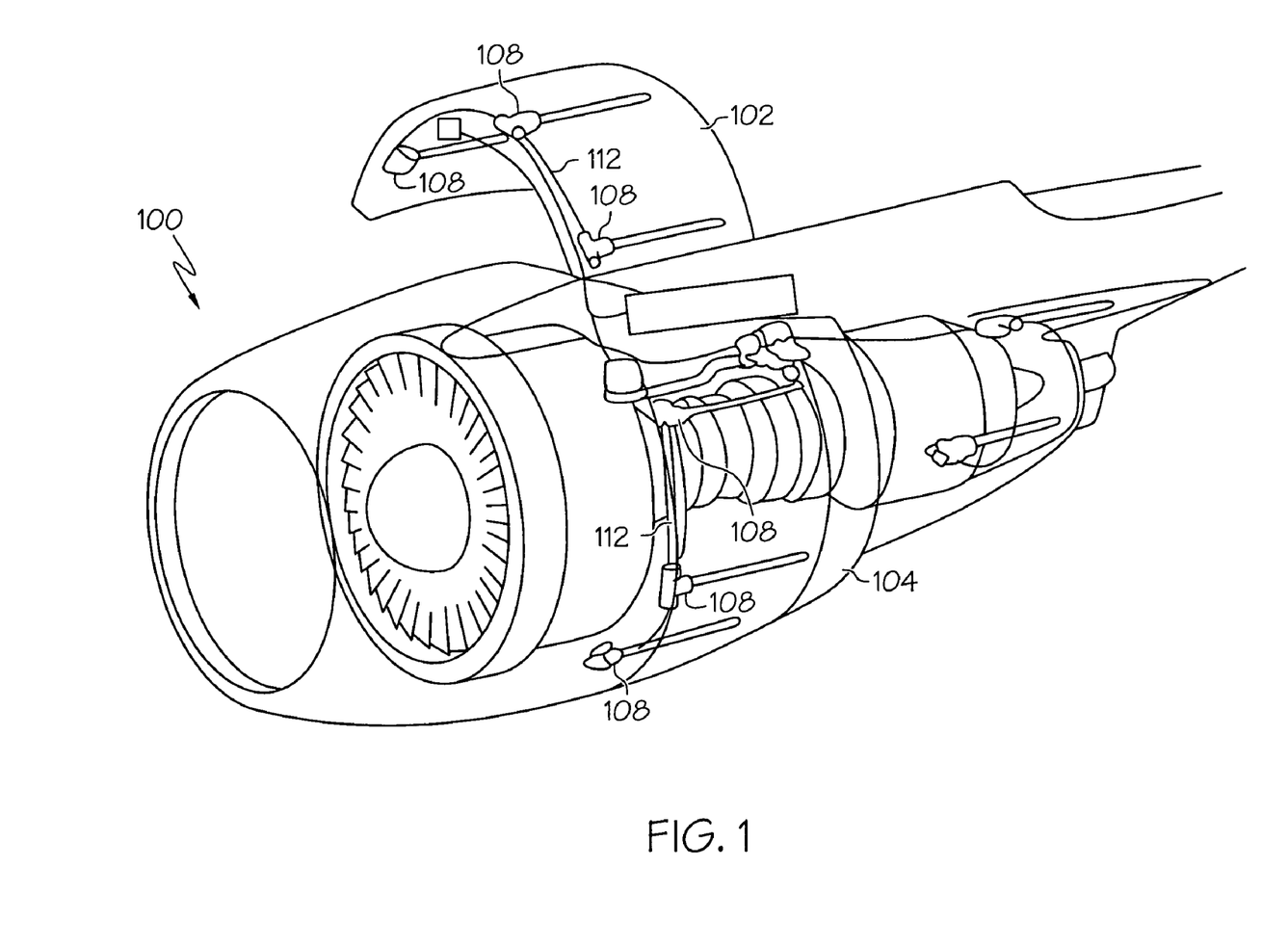
FIG. 1 illustrates portions of an aircraft jet engine fan case.

Turning now to the description, and with reference first to FIG. 1, a perspective view of portions of an aircraft jet engine fan case 100 that incorporates a cascade-type thrust reverser is depicted. The engine fan case 100 includes a pair of semi-circular translating cowls, or transcowls, 102 and 104 that are positioned circumferentially on the outside of the fan case 100. The transcowls 102 and 104 cover a plurality of non-illustrated cascade vanes. A mechanical link not illustrated, such as a pin or latch, may couple the transcowls 102 and 104 together to maintain the transcowls 102 and 104 in correct alignment on non-illustrated guides on which the transcowls 102 and 104 translate.

When the thrust reversers are commanded to deploy, the transcowls 102 and 104 are translated aft. This, among other things, exposes the cascade vanes, and causes at least a portion of the air flowing through the engine fan case 100 to be redirected, at least partially, in a forward direction. This re-direction of air flow in a forward direction creates a reverse thrust, and thus works to slow the airplane.

Figure 2:
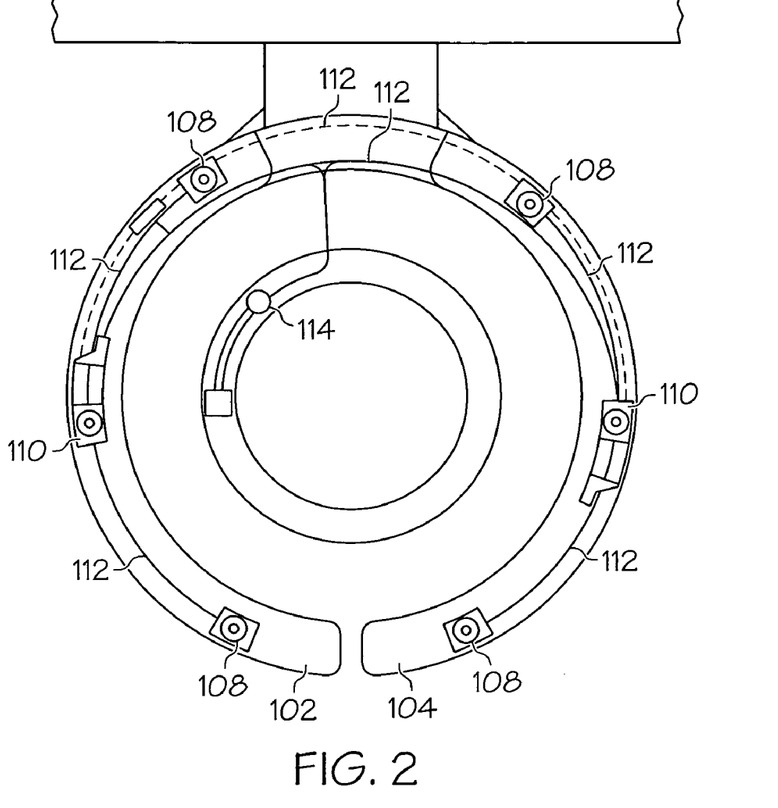
FIG. 2 is a simplified end view of a thrust reverser actuation system according to an exemplary embodiment of the present invention.

As shown more clearly in FIG. 2, a plurality of actuator assemblies 108 are individually coupled to the transcowls 102 and 104. In the depicted embodiment, half of the actuator assemblies 108 are coupled to one of the transcowls 102, and the other half are coupled to another transcowl 104. While not critical to understand or enable the present invention, it is noted that some or all of the actuator assemblies 108 may include locks, some or all of which may include position sensors. It is noted that the actuator assemblies 108 may be any one of numerous actuator designs presently known in the art or hereafter designed, such as, for example, ballscrew actuators. It is additionally noted that the number and arrangement of the actuator assemblies 108 is not limited to what is depicted in FIG. 2, but could include other numbers of actuator assemblies 108 as well. The number and arrangement of actuators is selected to meet the specific design requirements of the system.

The actuator assemblies 108 are interconnected via a plurality of drive mechanisms 112, each of which, in the particular depicted embodiment, is a flexible shaft. Using flexible shafts in this configuration preferably ensures that the actuator assemblies 108 and the transcowls 102 and 104 move in a substantially synchronized manner. For example, when one transcowl 102 is moved, the other transcowl 104 is moved a like distance at substantially the same time. Other synchronization mechanisms that may be used include electrical synchronization or open loop synchronization, or any other mechanism or design that transfers power between the actuator assemblies 108.

A power drive unit (PDU) assembly 110 is coupled to the actuator assemblies 108 on each transcowl 102, 104 via one or more flexible shafts 112. The PDU assembly 110 is controlled by a control valve 114 The control valve 114 receives commands from a non-illustrated controller, and activates or deactivates the PDU assembly 110 in response to the received commands. In turn, the PDU assembly 110 supplies a drive force to the actuator assemblies 108 via the flexible shafts 112. As a result, the actuator assemblies 108 cause the transcowls 102 and 104 to translate between the stowed and deployed positions.

Figure 3:
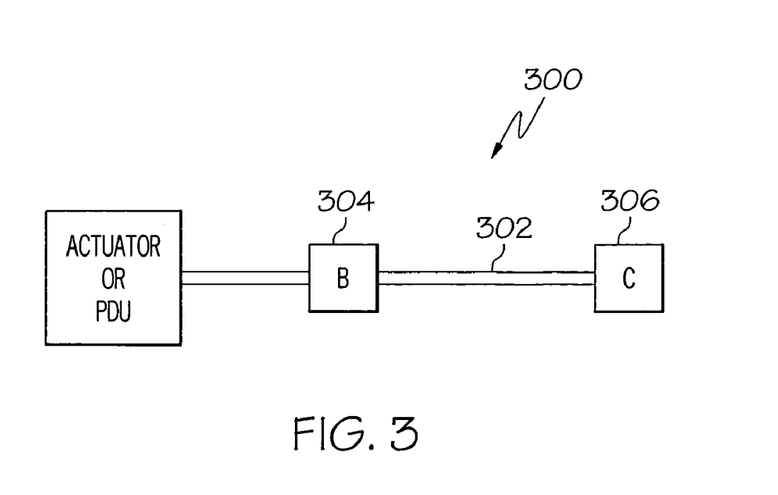
FIG. 3 is a schematic of an exemplary brake/clutch assembly that may be implemented into the thrust reverser actuation system of FIG. 2.

One or more of the actuator assemblies 108 and the PDU assembly 110 includes a brake/clutch assembly 300, schematically shown in FIG. 3. The brake/clutch assembly 300 is configured to slow or stop the actuation of the actuator or the PDU assemblies 108, 110. In this regard, the brake/clutch assembly 300 is mounted to a shaft 302 that is coupled to the actuator assembly 108 or the PDU assembly 110 and a portion of the brake/clutch assembly 300 is configured to rotate therewith. The brake/clutch assembly 300 includes a brake 304 coupled to a clutch 306 that together act as two brakes in series with each other. The brake 304 may be any one of numerous types of conventional brakes, such as, for example, a sliding friction-type brake, disk brake, or a cone brake.

Figure 4:
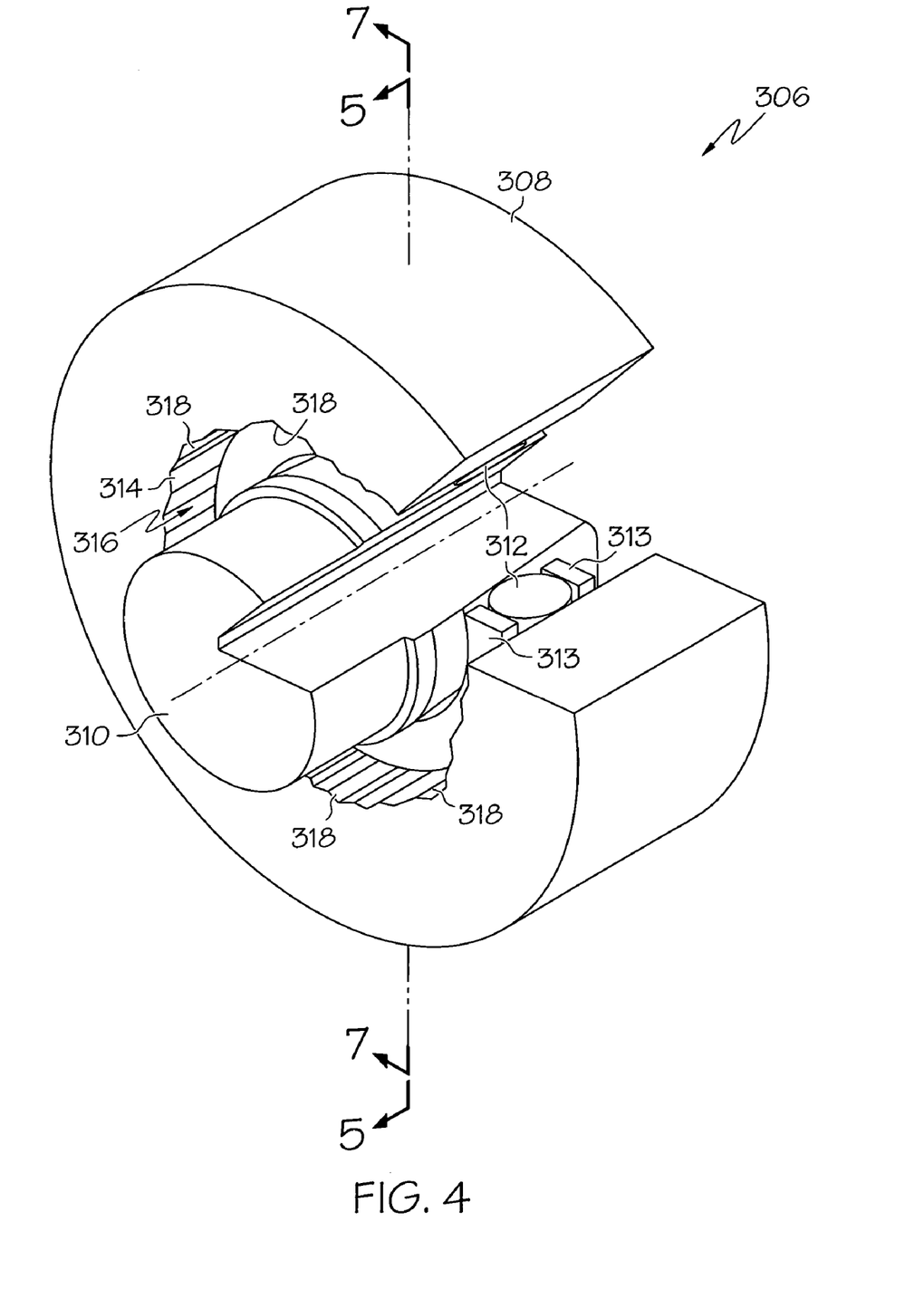
FIG. 4 is a perspective view of an exemplary clutch.

FIG. 4 shows an exemplary clutch 306 that includes a stator 308, a rotor 310, and a plurality of clutch elements 312, such as bearings or rollers, disposed therebetween. The clutch elements 312 are maintained axially on the rotor 310. The clutch 306 is configured to lock or unlock based upon a rotational direction of the rotor 310 relative to the stator 308 and the lateral and/or axial positioning of the clutch elements 312. The stator 308 is generally cylindrical and has an inner peripheral surface 314. The inner peripheral surface 314 defines a channel 316 through which the rotor 310 at least partially extends. Additionally, the inner peripheral surface 314 includes a plurality of axial grooves 318 formed therein that define spaces for the disposal of one or more rows of clutch elements 312. Each axial groove 318 has a width that is sufficiently sized to allow the clutch element 312 to move from a first lateral position to a second lateral position and a sufficient length for the clutch element 312 to travel between a first axial position and a second axial position.

Figure 5:
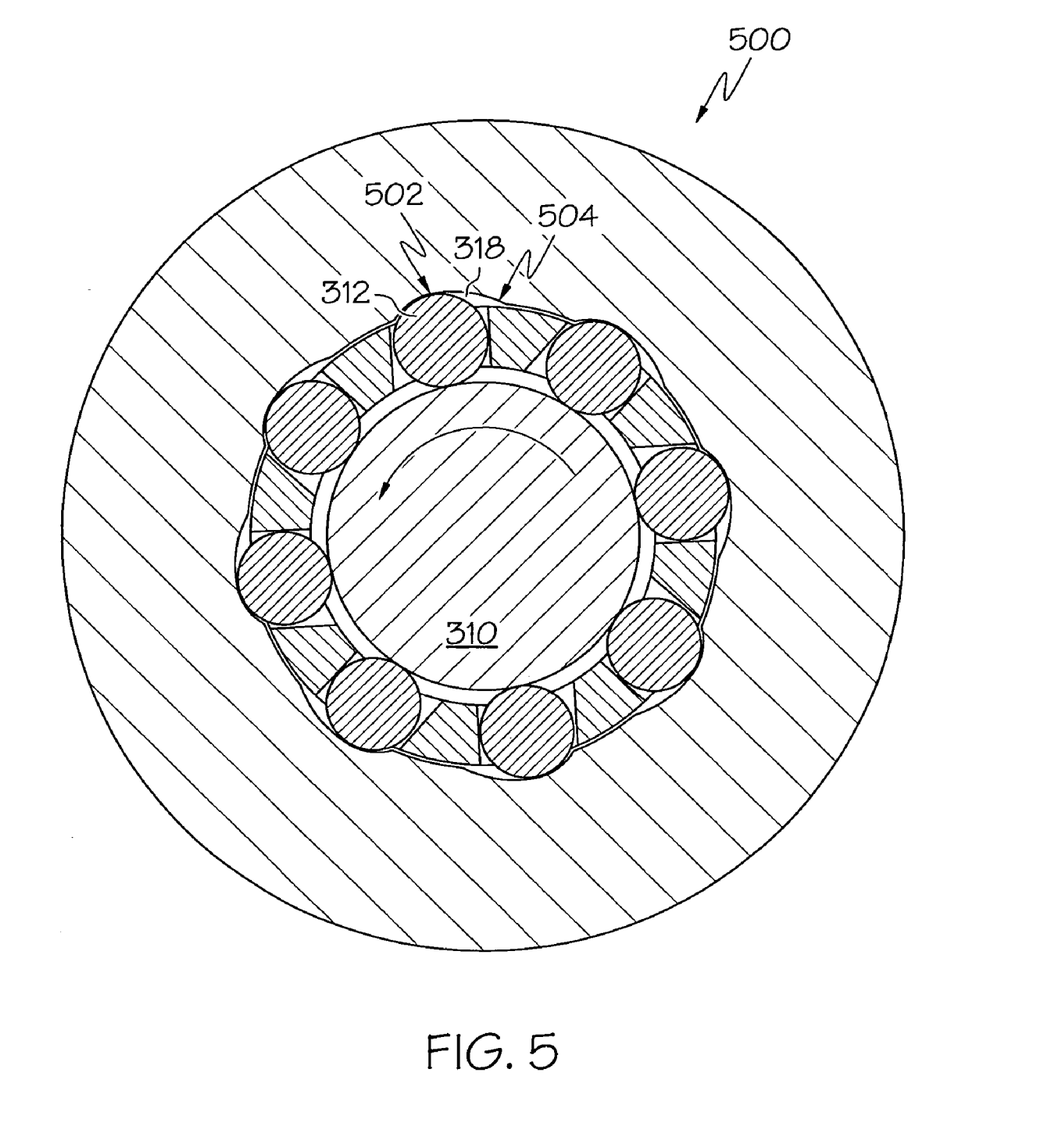
FIG. 5 is a cross section view of the exemplary clutch depicted in FIG. 4 taken along line 5-5.

Preferably, the first and second lateral positions are configured to define portions of clutch unlock and lock mechanisms. One embodiment of exemplary mechanisms is shown in FIG. 5, which illustrates a unidirectionally locking clutch 500 in an unlock configuration. The clutch 500 includes axial grooves 318 having a generally uneven U-shaped cross section for defining an unlock position 502 and a lock position 504. The unlock position 502 allows the clutch element 312 to freely roll when the rotor 310 is rotated in an unlock direction, while the lock position 504 pinches the clutch element 312 against the stator 308 when the rotor 310 rotates in a lock direction.

Figure 6:
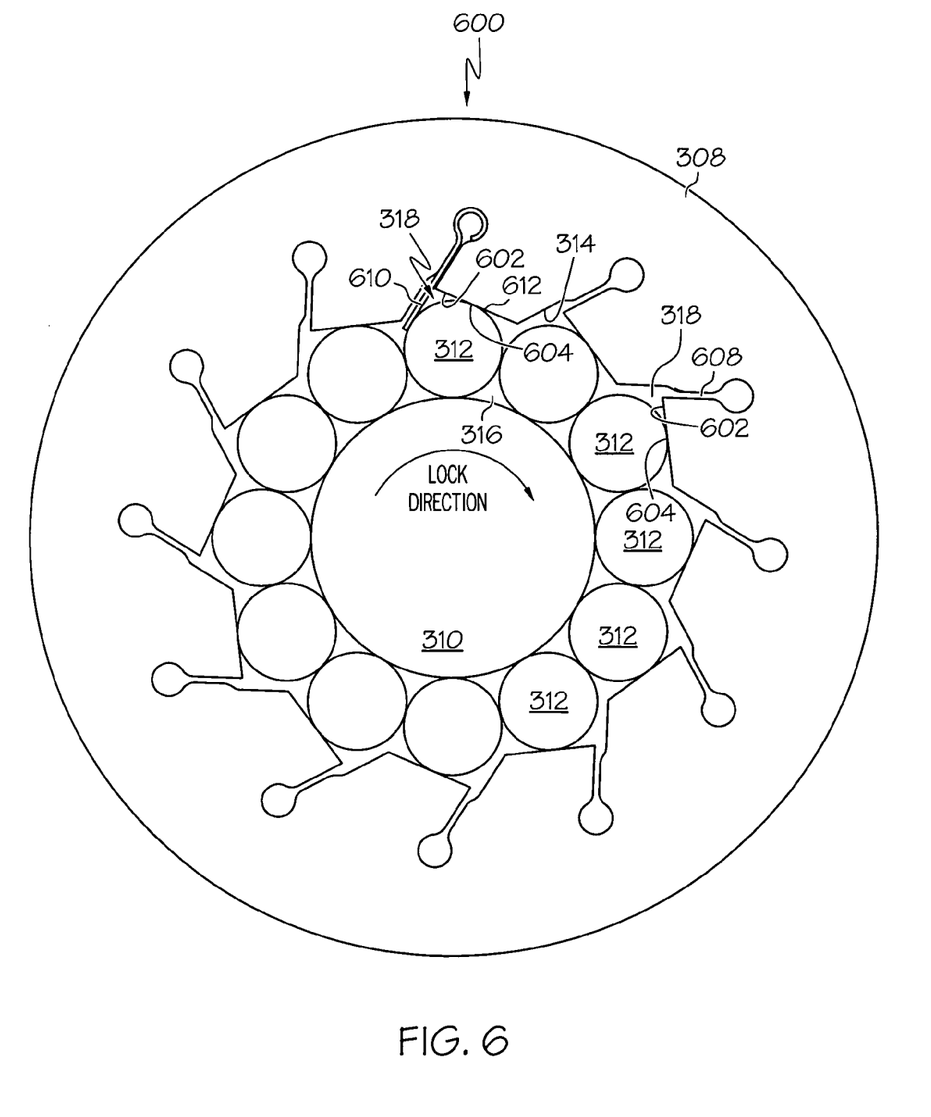
FIG. 6 is a cross section view of another exemplary clutch.

In another exemplary embodiment, the unlock and lock mechanisms are disposed in a bidirectionally locking clutch 600, as shown in FIG. 6. Here, each axial groove 318 is substantially V- or U-shaped and has an outer radial section 602 and an inner radial section 604. The outer radial section 602 communicates with a slot 608 formed in the stator 308. Radial springs 610 (only one of which is shown), which may be, for example, a leaf spring, are retained in each slot 608 and extend inwardly toward the rotor 310 to contact a portion of the clutch element 312 disposed in the axial groove 318. The radial springs 610 have a suitable spring constant that maintains the clutch element 312 in the axial groove 318 against the inner radial section 604.

Figure 7:
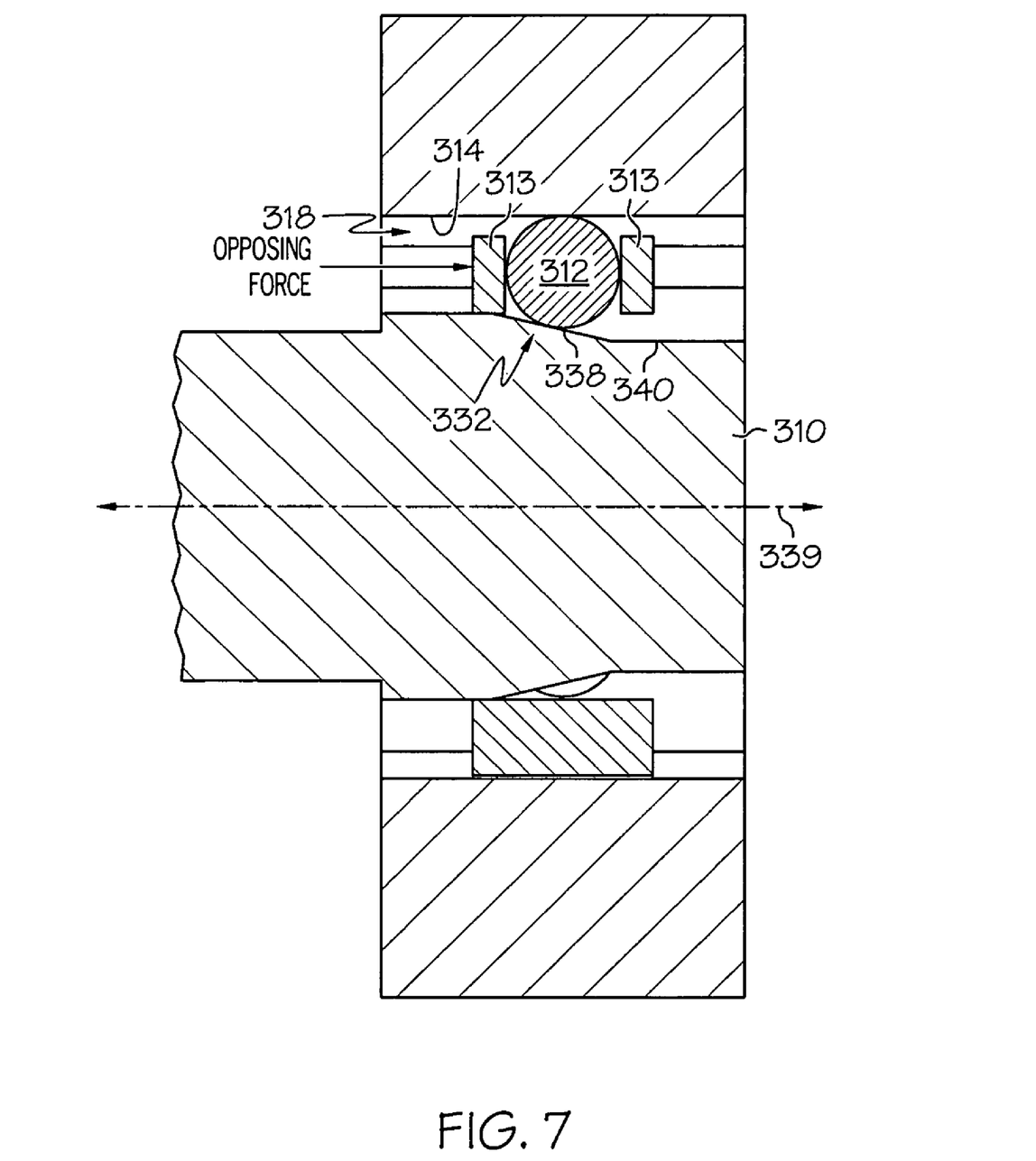
FIG. 7 is a cross section view of the exemplary clutch depicted in FIG. 4 taken along line 7-7.

In any case, when the rotor 310 is stationary, the radial spring 610 supplies a force against the clutch element 312 to maintain it in a space 612 between the axial groove outer radial section 602 and the rotor 310. As previously alluded to above, when the rotor 310 rotates in an unlock direction, the clutch element 312 rotates freely, in this case against the spring 610, while maintaining its position in the space 612. However, if the rotor 310 rotates in the lock direction, the clutch element 312 becomes pinched against the axial groove inner radial section 604 and the rotor 310 to thereby lock the clutch 306. In this example, the spring 610 is also used to bias the clutch elements 312 toward the lock position to ensure that they are engaged, or "pinched" uniformly during rotation in the lock direction As mentioned briefly above, the clutch element 312 travels between a first and a second axial position in the axial groove 318. The first and second axial positions preferably define engage and disengage positions, where the clutch element 312 is maintained at the engage position during unlocking and locking of the clutch 306 but moved to the disengage position when the clutch 306 is overrunning (such as when the rotor 310 continues to rotate in a lock direction after the clutch 306 has already been locked). In this regard, as shown in FIGS. 7 and 8, each clutch element 312 is positioned on an angled, ramped land 332 in communication with an axial force source 334.

The ramped land 332 is formed on or coupled to an outer surface of the rotor 310 and may be a groove (shown in FIG. 7) that extends around the circumference thereof, a groove extending partially around the rotor 310, a radially protruding ring that extends around the circumference thereof (shown in FIG. 8), or a protruding flange formed thereon. In any case, the ramped land 332 includes first and second clutch element contact surfaces 338, 340, which provide the engage and disengage positions, respectively. Additionally, the first clutch element contact surface 338 preferably has a larger radial distance from a rotational axis 339 of the rotor 310 than the second clutch element contact surface 340.

The clutch elements 312 may be uniformly moved between the first and second clutch element contact surfaces 340, or alternatively may each be individually moved. In one exemplary embodiment, as shown in FIGS. 4, 5, and 7 the clutch elements 312 are disposed in a separator 313. The separator 313 is a ring-shaped component having a plurality of pockets formed therein for the disposal of each clutch element 312. The separator 313, and thus, the clutch elements 312, may be axially moved by a hydraulic, electromagnetic, or other axial force source 334 capable of supplying a predetermined axial force thereto that may be overcome by a predetermined torque magnitude.

Figure 8:
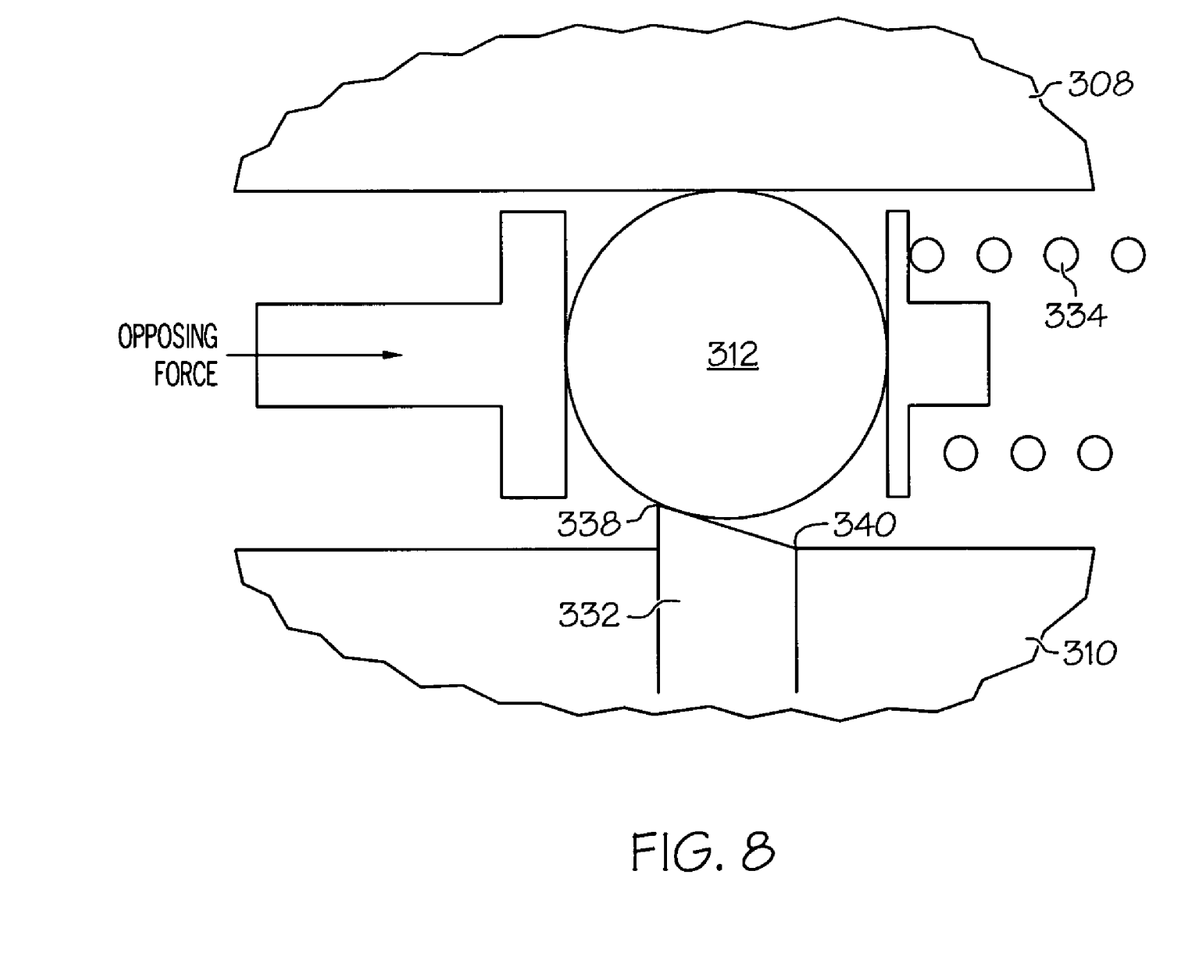
FIG. 8 is a side view of another exemplary clutch.

In another exemplary embodiment, each clutch element 312 is individually in contact with the axial force source 334, which may be a spring, as schematically depicted in FIG. 8. The spring may be coupled to any suitable portion of the clutch 306, or may extend from some point that is axially fixed with respect to rotor 310 through axial openings formed in a separator to contact the clutch elements 312. Preferably, the spring has a spring constant that suitably allows it to maintain the clutch element 312 on the first clutch element contact surface 338, while allowing the clutch element 312 to roll thereon. Additionally, the spring is preferably selected to provide a predetermined axial force that may be overcome by a predetermined torque magnitude.

In either case, when the rotor 310 is rotated in an unlock direction, the clutch elements 312 are positioned and remain on the first clutch element contact surface 338, as shown in FIGS. 7 and 8. Additionally, when the rotor 310 is rotated in a lock direction, the clutch elements 312 remain on the first surface 338, unless the predetermined torque magnitude is exceeded by an opposing force source that overcomes the predetermined axial force exerted on the separator 313 or supplied by the spring. In such case, such as when the rotor 310 is in an overrun condition, the elements 312 drop off of the first clutch element contact surface 338 and onto the second clutch element contact surface 340. As a result, the rotor 310 is allowed to continue to rotate without damaging the stator 308, the rotor 310, or clutch elements 312. It will be appreciated that the opposing force source may be provided by an axial component of a torque force from the radial pinching of the clutch elements 312 against the rotor 310 and stator 308, or from any other source.

In some embodiments, the predetermined axial force supplied against the separator 313 or by the spring may be configured to return the clutch element 312 back to the first clutch element contact surface 338 to thereby reengage the clutch 306. The return mechanism may be configured to act on command or may be automatic.

A clutch has now been provided that experiences minimal wear during operation and has rolling elements that, if displaced or misaligned, do not affect the operation of the assembly. Additionally, the clutch is operable with various types of brakes. Moreover, by replacing the radial springs 610 or changing the axial force source 334, the clutch may be easily re-configured to limit torque loading to as desired.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A clutch assembly comprising:
 a rotor having a rotational axis and an outer surface;
 a first clutch element contact surface disposed on the rotor outer surface;
 a second clutch element contact surface disposed on the rotor outer surface spaced axially from the first clutch element contact surface and having a smaller radial distance to the rotational axis than the first clutch element contact surface;
 a stator disposed around at least a portion of the rotor and having an inner surface defining an axial groove, the axial groove including an outer radial section and an inner radial section;
 a clutch element disposed between and in contact with the rotor and the stator inner surface;
 an axial force source in communication with the clutch element, the axial force source configured to supply a predetermined axial force to the clutch element in an axial direction; and
 a separator mounted around the rotor and configured to receive the predetermined axial force, the separator including a pocket formed therein within which the clutch element is disposed,
 wherein when an opposing force is applied to the clutch element in a direction opposite the axial direction, the assembly selectively (i) engages by providing contact between the clutch element and the first clutch element contact surface and by providing contact between the clutch element and the inner radial section of the axial groove, when the opposing force is less than the predetermined axial force, and (ii) disengages by providing contact between the clutch element and the second clutch element contact surface and by providing contact between the clutch element and the outer radial section of the axial groove, when the opposing force is greater than the predetermined axial force.

2. The assembly of claim 1, further comprising a radial spring configured to supply a force to maintain the clutch element at the first lateral position, wherein the clutch element and the inner radial section of the axial groove contact each other.

3. The assembly of claim 2, wherein the radial spring is a leaf spring.

4. The assembly of claim 1, further comprising a ramped land comprising a protrusion extending radially outwardly from the rotor and the first clutch element contact surface is located on the protrusion.

5. The assembly of claim 4, wherein the protrusion extends circumferentially around the rotor.

6. The assembly of claim 1, further comprising a ramped land comprising a groove formed in the rotor outer surface, and the first and second clutch element contact surfaces are located axially along the groove.

7. The assembly of claim 6, wherein the groove extends circumferentially around the rotor.

8. The assembly of claim 1, wherein the axial force source is a spring configured to move axially relative to the rotor.

9. A brake/clutch assembly comprising:
   a rotor having a rotational axis and an outer surface including a first clutch element contact surface and a second clutch element contact surface, the first clutch element contact surface located at a first axial position on the rotor and having a radial distance to the rotational axis, and the second clutch element contact surface located at a second axial position on the rotor having a second radial distance that is less than the first radial distance;
   a stator disposed around at least a portion of the rotor and having an inner surface defining a plurality of axial grooves, each axial groove including an outer radial section and an inner radial section;
   a plurality of clutch elements each corresponding to one of the first clutch element contact surfaces and one of the second clutch element surfaces, the clutch elements disposed between and in contact with the rotor and the stator inner surface;
   an axial force source in communication with each of the clutch elements, the axial force source configured to supply a predetermined axial force against the clutch elements in an axial direction; and
   a separator mounted around the rotor and configured to receive the predetermined axial force, the separator including a plurality of pockets formed therein within which the plurality of clutch elements are disposed,
   wherein when an opposing force is applied to at least one of the clutch elements in a direction opposite the axial direction, the assembly selectively (i) engages by providing contact between at least one of the clutch elements and the first clutch element contact surface and by providing contact between the clutch element and the inner radial section of the axial groove, when the opposing force is less than the predetermined axial force, and (ii) disengages by providing contact between the clutch element and the second clutch element contact surface and by providing contact between the clutch element and the outer radial section of the axial groove, when the opposing force is greater than the predetermined axial force.

10. The assembly of claim 9, wherein the plurality of clutch elements is disposed around the shaft in an annular pattern.

11. The assembly of claim 9, further comprising a plurality of radial springs configured to supply a force to maintain the clutch elements between the clutch element and the inner radial section of the axial groove.

12. The assembly of claim 9, further comprising at least one protrusion extending radially outwardly from the rotor, wherein the first contact surfaces is located on the protrusion.

13. The assembly of claim 12, wherein the protrusion extends circumferentially around the rotor.

14. The assembly of claim 9, further comprising a groove formed in the rotor outer surface, wherein the second contact surfaces is located in the groove.

15. The assembly of claim 14, wherein the groove extends circumferentially around the rotor.

* * * * *